(12) United States Patent
Christianson

(10) Patent No.: US 7,132,974 B1
(45) Date of Patent: Nov. 7, 2006

(54) METHODS AND SYSTEMS FOR ESTIMATING THREE DIMENSIONAL DISTRIBUTION OF TURBULENCE INTENSITY USING RADAR MEASUREMENTS

(75) Inventor: Paul E. Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/160,315

(22) Filed: Jun. 17, 2005

(51) Int. Cl.
*G01S 13/95* (2006.01)
*G01S 13/00* (2006.01)

(52) U.S. Cl. .................. 342/26 R; 342/26 B; 342/89; 342/159; 342/175; 342/176; 342/179; 342/195

(58) Field of Classification Search .... 342/26 R–26 D, 342/27, 28, 104, 105, 115, 175, 190–197, 342/176, 179, 180, 25 R–25 F, 82–103, 159–164
See application file for complete search history.

(56) References Cited

U.S. PATENT DOCUMENTS

| | | | | |
|---|---|---|---|---|
| 3,646,555 A | * | 2/1972 | Atlas | 342/26 R |
| 4,649,388 A | * | 3/1987 | Atlas | 342/26 D |
| 4,712,108 A | * | 12/1987 | Schwab | 342/26 D |
| RE33,152 E | * | 1/1990 | Atlas | 342/26 R |
| 5,130,712 A | * | 7/1992 | Rubin et al. | 342/26 D |
| 5,136,296 A | * | 8/1992 | Roettger et al. | 342/26 D |
| 5,164,731 A | * | 11/1992 | Borden et al. | 342/26 B |
| 5,221,924 A | * | 6/1993 | Wilson, Jr. | 342/26 D |
| 5,262,782 A | * | 11/1993 | Rubin et al. | 342/26 D |
| 5,359,330 A | * | 10/1994 | Rubin et al. | 342/26 D |
| 6,184,816 B1 | * | 2/2001 | Zheng et al. | 342/26 R |
| 6,456,226 B1 | * | 9/2002 | Zheng et al. | 342/26 R |
| 6,563,452 B1 | * | 5/2003 | Zheng et al. | 342/26 R |
| 6,597,305 B1 | * | 7/2003 | Szeto et al. | 342/26 R |
| 6,667,710 B1 | * | 12/2003 | Cornell et al. | 342/26 R |
| 6,690,317 B1 | * | 2/2004 | Szeto et al. | 342/26 R |
| 6,720,906 B1 | * | 4/2004 | Szeto et al. | 342/26 R |
| 6,839,018 B1 | * | 1/2005 | Szeto et al. | 342/179 |
| 6,920,233 B1 | * | 7/2005 | Wolfson et al. | 342/26 R |

* cited by examiner

*Primary Examiner*—Bernarr E. Gregory
(74) *Attorney, Agent, or Firm*—Black Lowe & Graham PLLC

(57) ABSTRACT

Methods, systems, and computer program products for storing turbulence radar return data into a three-dimensional buffer. The method involves modeling the radar signal scattering properties of space surrounding the radar/aircraft. Presented turbulent wind variance measurements are compared to predictions of the measurement using the modeled scattering properties, thereby producing more accurate turbulence information for storage into the three-dimensional buffer.

11 Claims, 4 Drawing Sheets

METHODS AND SYSTEMS FOR ESTIMATING THREE DIMENSIONAL DISTRIBUTION OF TURBULENCE INTENSITY USING RADAR MEASUREMENTS

BACKGROUND OF THE INVENTION

Radar is frequently used to detect atmospheric turbulence. A typical application is to use radar installed on an aircraft to detect hazardous turbulence and display its relative location with respect to the aircraft so that the pilot can avoid it. The detection of turbulence using radar involves the processing of signals transmitted by the radar and scattered from water droplets embedded in the turbulent air. Signal processing is performed to produce the Doppler second moment of the signal, which is then related to the degree of hazard that would be expected from flying through the turbulent area.

Standard practice in using radar to estimate turbulence hazard is to sweep the radar antenna at a pilot selected tilt angle (elevation angle with respect to the horizon), or an automatically selected tilt. The turbulence signal processing is performed as the signals are received, and related spatially to the range and pointing direction. As the antenna is scanned back and forth in azimuth, the turbulence is re-detected each time the antenna sweeps past the turbulent parcel of air. Atmospheric turbulence has some persistence spatially and temporally. That is, a parcel of turbulent air moves relatively slowly (with respect to the time scale of an antenna scan). Also, its intensity changes relatively slowly. By re-detecting the turbulence on every antenna scan, the standard radar cannot take advantage of previous measurements to improve the quality of the estimate of the turbulence hazard.

Because radar detection requires the presence of water droplets of sufficient size, radar is most useful for detecting turbulence associated with convection. The vertical motions caused by convection are responsible for generating the turbulence. As a result, the regions of turbulent air typically have some vertical extent that is not well reflected in the turbulence measurement from a radar scanning at a single tilt.

Therefore, there exists a need to more accurately identify turbulence weather information.

BRIEF SUMMARY OF THE INVENTION

The present invention provides methods, systems, and computer program products for storing turbulence radar return data into a three-dimensional buffer. The method involves modeling the radar signal scattering properties of space surrounding the radar/aircraft. Presented turbulence intensity measurements are compared to predictions of the measurement using the modeled scattering properties, thereby producing more accurate turbulence information for storage into the three-dimensional buffer.

As will be readily appreciated from the foregoing summary, the invention provides more accurate information for storage in a three-dimensional buffer by using the radar signal power measurements to estimate turbulence information. The process is performed by iteratively updating estimates of the distribution of turbulent wind variance (which is a measure of turbulence intensity) by using the difference between radar measurements and expected measurement values generated based on a model of the measurement process acting on previously stored estimates of the turbulence information (turbulent wind variance).

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

The present invention allows for display of the three-dimensional position and extent of turbulence in the vicinity of a turbulence-detecting radar. The measurement of the distribution of turbulence in three dimensions provides a better awareness of hazardous weather in the vicinity. Also, the three-dimensional picture of the hazard, plus observation over time provides a better means of anticipating developing hazards since developing convection may first be detected below the flight path.

Figure 1:
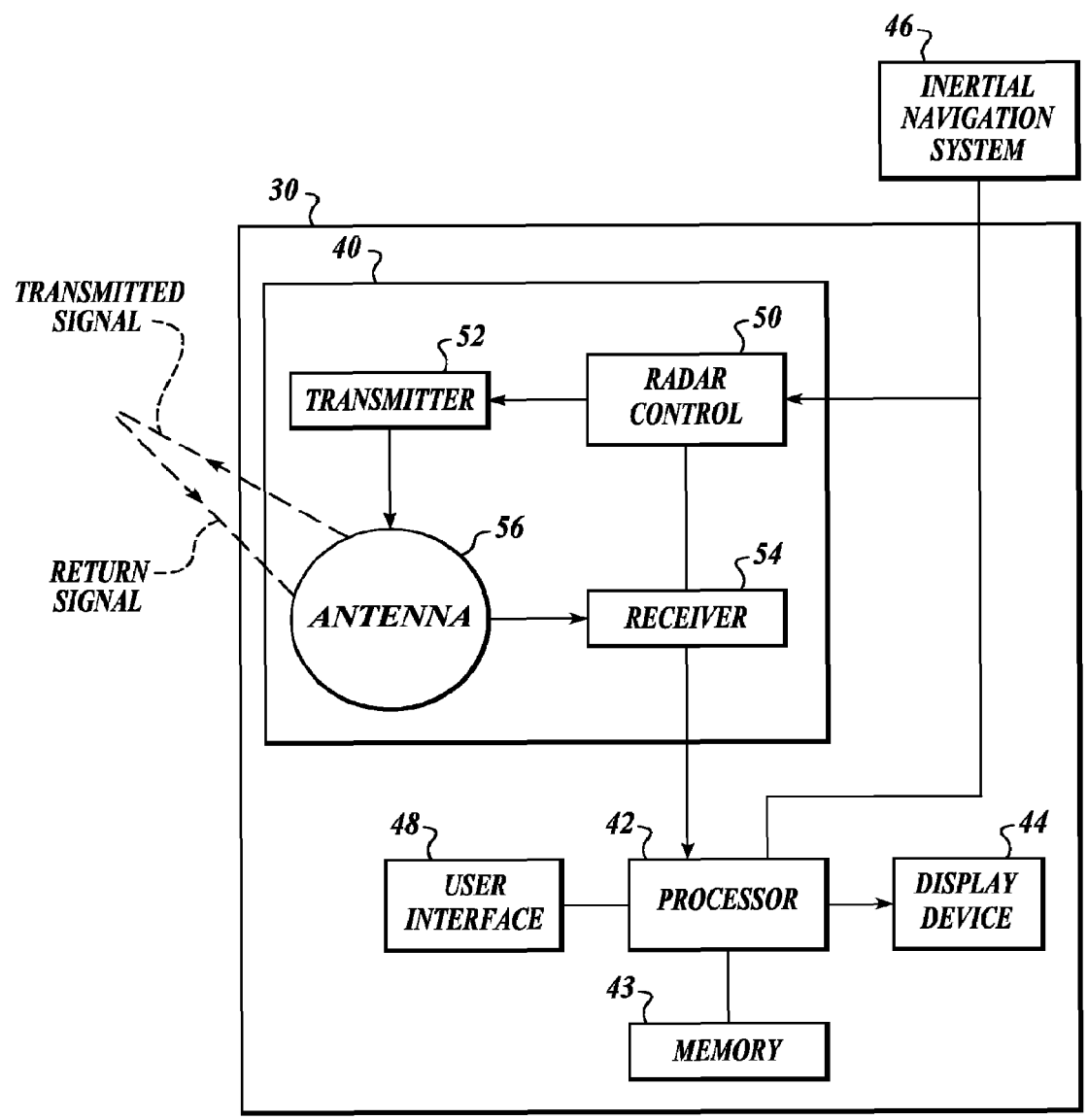
FIG. 1 is block diagram of a system that performs the present invention.

The present invention includes systems, methods, and computer program products for storing three-dimensional radar return turbulence data. FIG. 1 illustrates an example system 30 formed in accordance with the present invention. The system 30 includes a weather radar system 40, a processor 42, memory 43, a display device 44, an inertial navigation system (INS) 46, and a user interface 48 coupled to the processor 42. The processor 42 is electrically coupled to the radar system 40, the display device 44, the INS 46, and the memory 43. An example radar system 40 includes a radar controller 50, a transmitter 52, a receiver 54, and an antenna 56. The radar controller 50 controls the transmitter 52 and the receiver 54 for performing the sending and receiving of radar signals through the antenna 56 based on aircraft data (i.e., position, heading, roll, yaw, pitch, etc.) received from the INS 46, or other aircraft systems.

The radar system 40 receives signals that arise from the scattering of transmitted pulses from the external environment. The received signals are passed to the processor 42, which uses the received signals to update estimates of turbulent wind variance contained in computer memory (three-dimensional (3-D) buffer). The processor 42 generates an image for presentation on the display device 44 based on any control signals sent from the user interface 48 or based on settings within the processor 42.

Figure 2A:
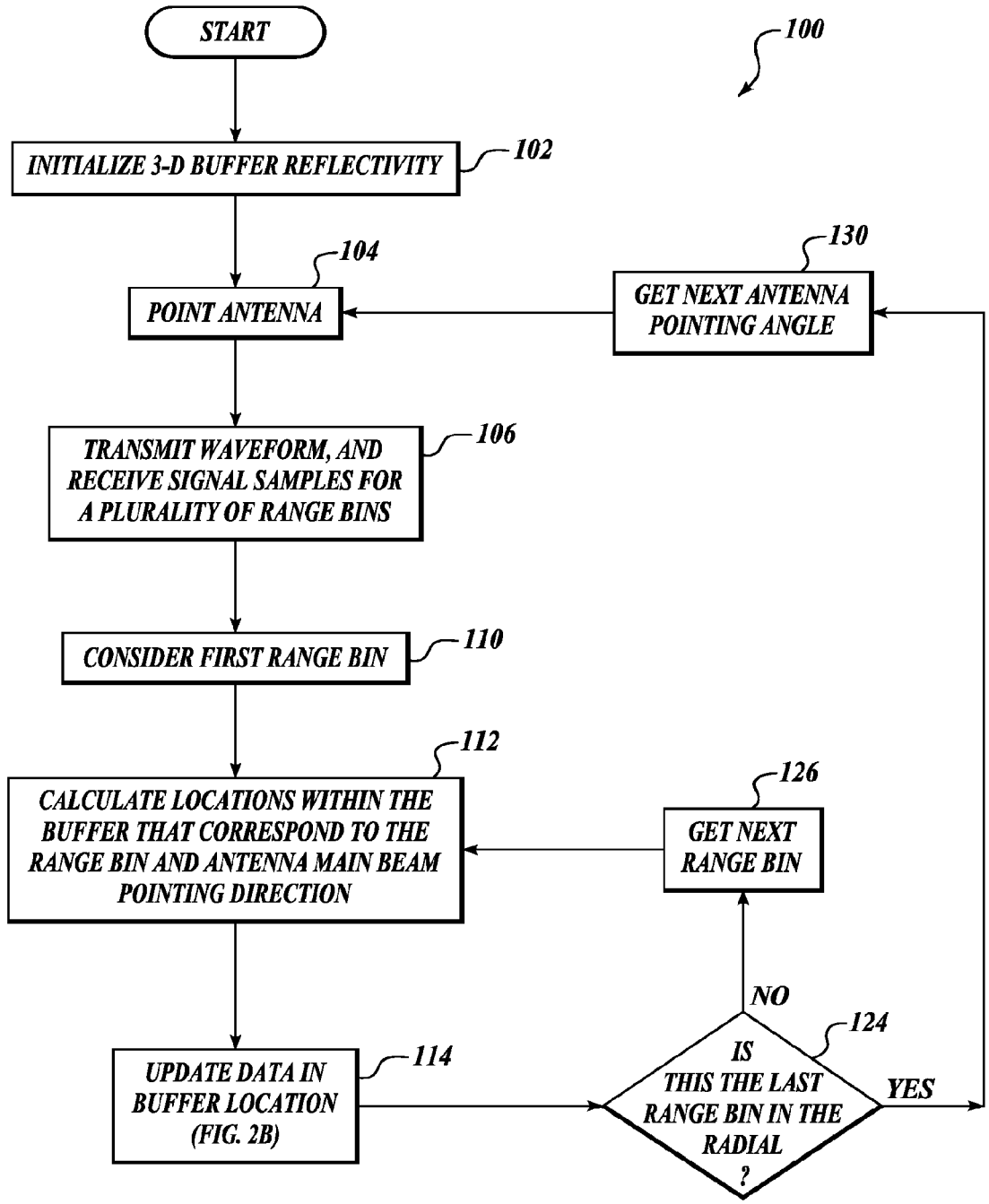
FIGS. 2A and B illustrate a flow diagram of a process performed by the system shown in FIG. 1.

FIG. 2A illustrates an example process 100 for storing turbulence values in a three-dimensional display buffer stored in the memory 43. First, at a block 102, turbulence values associated with 3-D buffer locations are initialized to some beginning values, e.g., no turbulence. At a block 104, the main beam of the antenna is pointed in a particular radial direction. Next, at a block 106, the radar system transmits a waveform over the antenna, and receives signal samples for a plurality of range bins based on the transmitted waveform.

Then, at a block 110, the first range bin of the receive signal is considered. As part of the consideration of the first range bin, at a block 112, the processor 42 calculates locations within the 3-D buffer that correspond to the range bin and the antenna pointing direction. At a block 114, the turbulence data located in the calculated buffer locations are adjusted according to the received signal samples and associated range bin. The process shown in block 114 is described in more detail with regard to FIG. 2B. At a decision block 124, if the present range bin is not the last range bin in the present radial or pointing direction of the antenna, the process 100 continues on to the next range bin of the received signal, block 126. Once the next range bin value has been retrieved, the process continues on to the block 112 until the last range bin value has been reached. When the last range bin value has been reached, as determined at the decision block 124, the system gets the next antenna pointing angle, see block 130, and returns the process to block 104 where the antenna is pointed to the retrieved next antenna pointing angle.

In one embodiment, for example, the received scattered signal from weather radar is processed to determine a turbulent wind variance value that is used to update an estimated three-dimensional distribution of turbulent wind variance in the vicinity of the radar. The turbulent wind variance is the variance of the turbulence component of the atmospheric flow. Turbulent wind variance is related to the turbulent kinetic energy (TKE) and can be related to eddy dissipation rate (EDR), which are other commonly used measures of turbulence intensity.

An update of turbulent wind variance using radar measurements requires an adjustment of the radar measurement. Radar signal processing for turbulence detection typically produces an estimate of Doppler second moment. The second moment represents the wind variance contained within the radar resolution volume defined roughly by the antenna main beam solid angle and the range resolution of the waveform used. This volume may not have sufficient extent to contain all the variance in the turbulent wind component. Therefore, the measured second moment will in general have to be corrected to account for this effect in order to obtain an estimate of turbulent wind variance. Because the radar resolution volume is a function of range, a correction function can be defined which is a function of range. This compensation function is obtained by assessing the effect of resolution volume on the measurement in the context of a standard statistical description of turbulence (e.g., the Von Karman turbulence characterization).

Figure 2B:
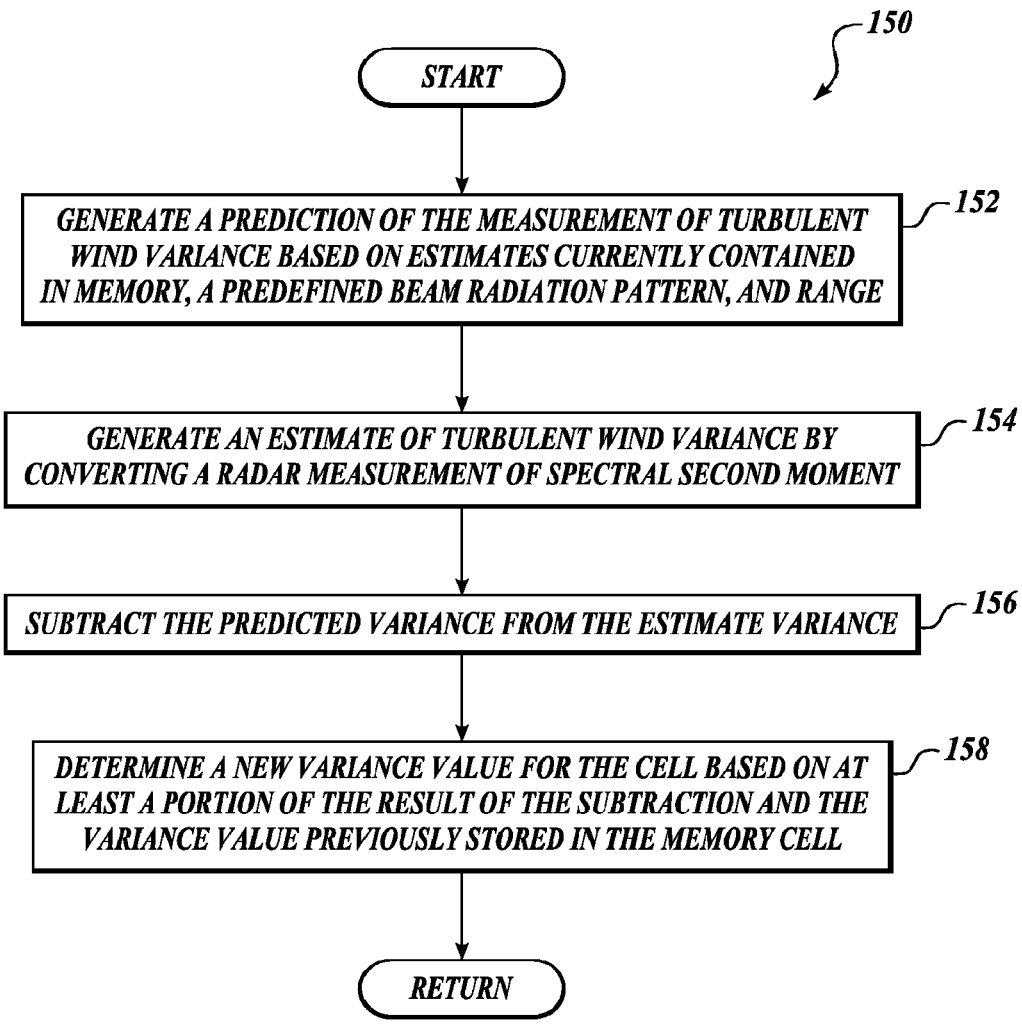

Estimates of turbulent wind variance derived from radar measurements are then used to update the three-dimensional distribution of turbulent wind variance contained in computer memory (3-D buffer). As shown in FIG. 2B, the update process at block 152 first predicts the value of the measurement given the data that is already stored in the memory 43 (by previous measurements). This prediction is subtracted at block 156 from the actual (estimate) measurement that was generated at block 154. The estimate turbulent wind variance is generated by converting a radar measurement of spectral second moment. The difference gives a measure of the error in the stored distribution of variance. In addition to the error in the stored distribution, this difference also contains measurement noise and some modeling error. Therefore, the update process must consider these effects in using the difference in the update process. This would generally be done by scaling the difference by a factor less than one, see block 158 where a new variance is based on at least a portion of the result of the subtraction and the variance value previously stored in the memory. This has the effect of applying a temporal filter to the distribution of variance.

The following is a known example of converting radar measurements to a turbulent wind variance value. Signal statistics products (R0 and R1) are applied to cross-range and down-range spatial filters. The extent of the cross-range filters is a function of range resulting in an approximately constant cross-range filter size. Cross-range and down-range filters are sized to give extents of roughly equal to 1000 meters (an assumed extent over which the process might be considered roughly stationary). The complex R1 values are compensated for Doppler using true airspeed. Filtered signal statistics are used to estimate spectral second moment using a pulse-pair algorithm. The second moments are compensated for beam-broadening using true airspeed and antenna pointing angle corresponding to the center azimuth of the cross-range filter. The second moment estimates are multiplied by a function of range that results in an estimate of turbulent wind variance under the assumption that the turbulence has characteristics described by standard turbulence theory. This assumed form of the turbulence is Von Karman, with scale length of 500 meters. The function is calculated using the size of the antenna beam, the extents of the spatial filters, and the assumed statistical characteristic of the turbulent wind field.

A measurement of turbulent wind variance has associated with it a range and an antenna pointing direction. The prediction of the variance measurement is obtained by making an assumption that the measurement of variance is approximated by a beam-weighted sum of the individual variances stored for each cell representing an increment of volume in the space in the vicinity of the radar. The beam weighting is accomplished such that the sum of the beam weights is one. For a given radar position, antenna pointing direction, and at a given range, certain cells can be identified that will contribute to the measurement of variance.

Figure 3:
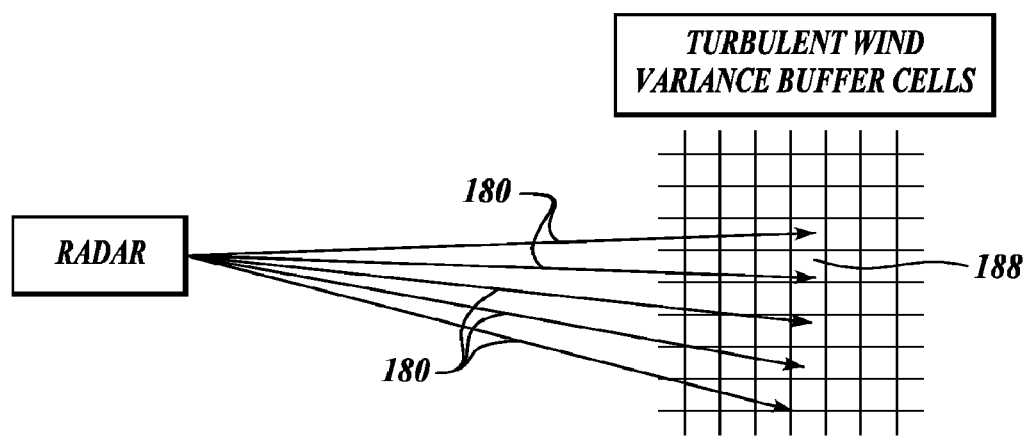
FIG. 3 illustrates vectors of a radar signal as they project into buffer cells at a particular range.

FIG. 3 illustrates a two-dimensional situation. The length of each of the vectors 180 is equal to the range associated with the measurement. Each of the vectors 180 has a gain value associated with it that is derived from an antenna main beam radiation pattern. The prediction of the measurement is approximated by the sum over the vectors 180 of the variance of a cell 188 pointed to by each vector multiplied by the gain associated with that vector. More complex measurement models could be implemented.

In the measurement model, the summation over the vectors representing incremental directions within the antenna main beam can be expressed in the form:

$$\sigma_{meas}^2 = \sum_i H_i \sigma_i^2,$$

where summation is over the buffer cells contributing to the measurement, $\sigma_{meas}^2$ is the predicted measurement, $\sigma_i^2$ is the variance stored with ith cell, and coefficient $H_i$ gives the weighting for the ith cell variance in the measurement. These coefficients $H_i$ are obtained by summing the weights for each vector pointing into the ith cell.

The buffer cell variance update process is given by $$\sigma_{i,new}^2 = \sigma_i^2 K_i (\sigma_{meas}^2 - \hat{\sigma}_{meas}^2),$$

where $\sigma_{meas}^2$ is the radar-based measurement and $K_i$ is a gain value that defines how much of the measurement difference to use in the update of the ith cell. There are numerous options for calculating the $K_i$'s. A characteristic of these coefficients $K_i$ is that the greatest update should go to the cells that contribute most to the prediction of the measurement. One option that satisfies this condition is to choose $K_i = g H_i$, where the filter gain g has a value less than one. There are numerous options for determining the value of g, including using a constant, or using a function of signal-to-noise ratio. Suspect measurements that might be contaminated by ground clutter might be de-emphasized by reducing the value of g.

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A method for generating a three-dimensional buffer of wind turbulence around a radar system based on radar system return data, the method comprising:
    a) receiving a radar measurement from the radar system as a result of a radar return from a transmitted radar beam;
    b) generating a wind turbulence value based on the received radar measurement;
    c) generating a prediction of wind turbulence for a location in the buffer based on wind turbulence data stored in the location, a previously defined beam radiation pattern, and range of space external to the radar system that is associated with the location;
    d) subtracting the generated prediction from the generated wind turbulence value;
    e) adjusting the wind turbulence data stored in the location based on the result of the subtraction; and
    f) generating an image for display.

2. The method of claim 1, wherein the radiation pattern is a pattern of the transmitted radar beam based on a radar range weighting function.

3. The method of claim 1, further comprising:
    f) repeating a–e for all locations associated with a pointing angle and one of a plurality of range bins.

4. The method of claim 3, further comprising:
    repeating a–f for other pointing angles.

5. A system comprising:
    a radar system for transmitting a radar signal and generating a wind turbulence value based on a radar return of the transmitted radar signal;
    memory for storing wind turbulence values in a three-dimensional buffer; and
    a processor coupled to the radar system and memory, the processor comprising:
        a first component for generating a prediction of wind turbulence for a location in the buffer based on wind turbulence data stored in the location, a previously defined beam radiation pattern, and range of space external to the radar system associated with the location;
        a second component for subtracting the generated prediction from the generated wind turbulence value; and
        a third component for adjusting one or more of the stored reflectivity values based on the result of the subtraction.

6. The system of claim 5, wherein the radiation pattern is a pattern of the transmitted radar beam based on a radar range weighting function system.

7. The system of claim 5, wherein the processor repeats for all locations associated with a pointing angle and one of a plurality of range bins and repeats for other pointing angles.

8. A computer program product residing on a computer-readable medium for generating a computer model of an environment around a radar system based on radar system return data, the computer program product comprising:
    a first component for receiving a radar measurement from a radar system as a result of a radar return from a transmitted radar beam;
    a second component for generating a wind turbulence value based on the received radar measurement;
    a third component for generating a prediction of wind turbulence for a location in the buffer based on wind turbulence data stored in the location, a previously defined beam radiation pattern, and range of space external to the radar system that is associated with the location;
    a fourth component for subtracting the generated prediction from the generated wind turbulence value;
    a fifth component for adjusting one or more reflectivity values based on the result of the subtraction; and
    a sixth component for generating an image for display,
    wherein the first thru sixth components reside on a computer-readable medium.

9. The product of claim 8, wherein the second component generates a wind turbulence value based on an antenna beam radiation pattern and a radar range weighting function.

10. The product of claim 8, further comprising:
    a seventh component for repeating the steps performed by the first through fifth components for all locations associated with a pointing angle and one of a plurality of range bins.

11. The product of claim 10, further comprising:
    a eighth component for repeating the steps performed by the first through sixth components for other pointing angles.

* * * * *